US010911483B1

(12) United States Patent
Wasiq

(10) Patent No.: US 10,911,483 B1
(45) Date of Patent: Feb. 2, 2021

(54) EARLY DETECTION OF DEDICATED DENIAL OF SERVICE ATTACKS THROUGH METRICS CORRELATION

(71) Applicant: Amazon Technologies, Inc., Seattle, WA (US)

(72) Inventor: Muhammad Wasiq, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 56 days.

(21) Appl. No.: 15/463,986

(22) Filed: Mar. 20, 2017

(51) Int. Cl.
*H04L 29/06* (2006.01)
*H04L 29/12* (2006.01)
*H04L 29/08* (2006.01)
*H04L 9/32* (2006.01)
*H04L 9/08* (2006.01)

(52) U.S. Cl.
CPC ........ *H04L 63/1458* (2013.01); *H04L 9/0861* (2013.01); *H04L 9/3236* (2013.01); *H04L 29/06* (2013.01); *H04L 61/1511* (2013.01); *H04L 61/2007* (2013.01); *H04L 63/0281* (2013.01); *H04L 63/08* (2013.01); *H04L 63/10* (2013.01); *H04L 67/16* (2013.01); *H04L 67/32* (2013.01); *H04L 67/42* (2013.01); *H04L 2463/142* (2013.01)

(58) Field of Classification Search
CPC ............................ H04L 63/1458; H04L 29/06
See application file for complete search history.

(56) References Cited

U.S. PATENT DOCUMENTS

| 8,613,089 | B1* | 12/2013 | Holloway | H04L 63/1458 726/23 |
| 9,804,891 | B1* | 10/2017 | Adalier | G06F 9/5038 |
| 9,930,131 | B2* | 3/2018 | MacCarthaigh | H04L 29/08288 |
| 9,979,588 | B1* | 5/2018 | Benson | H04L 61/1511 |
| 2006/0047832 | A1* | 3/2006 | Betts | H04L 12/22 709/229 |
| 2006/0075084 | A1* | 4/2006 | Lyon | H04L 29/06027 709/223 |
| 2009/0106318 | A1* | 4/2009 | Mantripragada | H04L 63/1408 |
| 2010/0122342 | A1* | 5/2010 | El-Moussa | H04L 63/1425 726/22 |
| 2010/0138921 | A1* | 6/2010 | Na | H04L 63/1458 726/22 |
| 2012/0096549 | A1* | 4/2012 | Amini | H04L 63/1433 726/23 |
| 2012/0174196 | A1* | 7/2012 | Bhogavilli | H04L 63/1458 726/5 |
| 2012/0174220 | A1* | 7/2012 | Rodriguez | H04L 63/1416 726/23 |

(Continued)

*Primary Examiner* — Jason Chiang
(74) *Attorney, Agent, or Firm* — Davis Wright Tremaine LLP

(57) ABSTRACT

A monitoring service obtains request data specifying entries corresponding to requests received by a Domain Name System service to obtain an Internet Protocol address for a resource and to requests received by a web service to access the resource. The monitoring service uses that request data to generate a request frequency value corresponding to the received requests and compares this value to a baseline request frequency value. If the request frequency value exceeds the baseline request frequency value by a maximum threshold value, the monitoring service performs an operation to redirect network traffic originally directed towards the web service.

20 Claims, 7 Drawing Sheets

(56) References Cited

U.S. PATENT DOCUMENTS

| | | | |
|---|---|---|---|
| 2013/0152189 A1* | 6/2013 | Lee | H04L 63/1408 726/13 |
| 2015/0026800 A1* | 1/2015 | Jain | H04L 63/1458 726/22 |
| 2015/0128263 A1* | 5/2015 | Raugas | H04L 63/1408 726/23 |
| 2016/0028763 A1* | 1/2016 | Cruz Mota | H04L 63/1458 726/23 |
| 2016/0036836 A1* | 2/2016 | Grill | H04L 63/1416 726/23 |
| 2016/0164912 A1* | 6/2016 | Del Fante | H04L 63/1416 726/23 |
| 2017/0111389 A1* | 4/2017 | Kasman | H04L 63/1458 |
| 2017/0339150 A1* | 11/2017 | Barsness | H04L 63/1425 |
| 2017/0366576 A1* | 12/2017 | Donahue | H04L 43/062 |
| 2018/0183830 A1* | 6/2018 | Wessels | H04L 63/1458 |

\* cited by examiner

EARLY DETECTION OF DEDICATED DENIAL OF SERVICE ATTACKS THROUGH METRICS CORRELATION

BACKGROUND

Computing services and other services often provide access to various resources, such as websites, to users to fulfill various needs. For instance, these websites may serve as online marketplaces, repositories of information, user services, and the like. However, these resources may be subject to Distributed Denial of Service (DDoS) attacks whereby multiple computer systems operating autonomously attempt to overwhelm a resource, rendering the resource inoperable or with limited functionality. Detecting a potential DDoS attack is difficult as the DDoS attack may occur rapidly and without warning.

BRIEF DESCRIPTION OF THE DRAWINGS

Various techniques will be described with reference to the drawings, in which.

DETAILED DESCRIPTION

Figure 1:
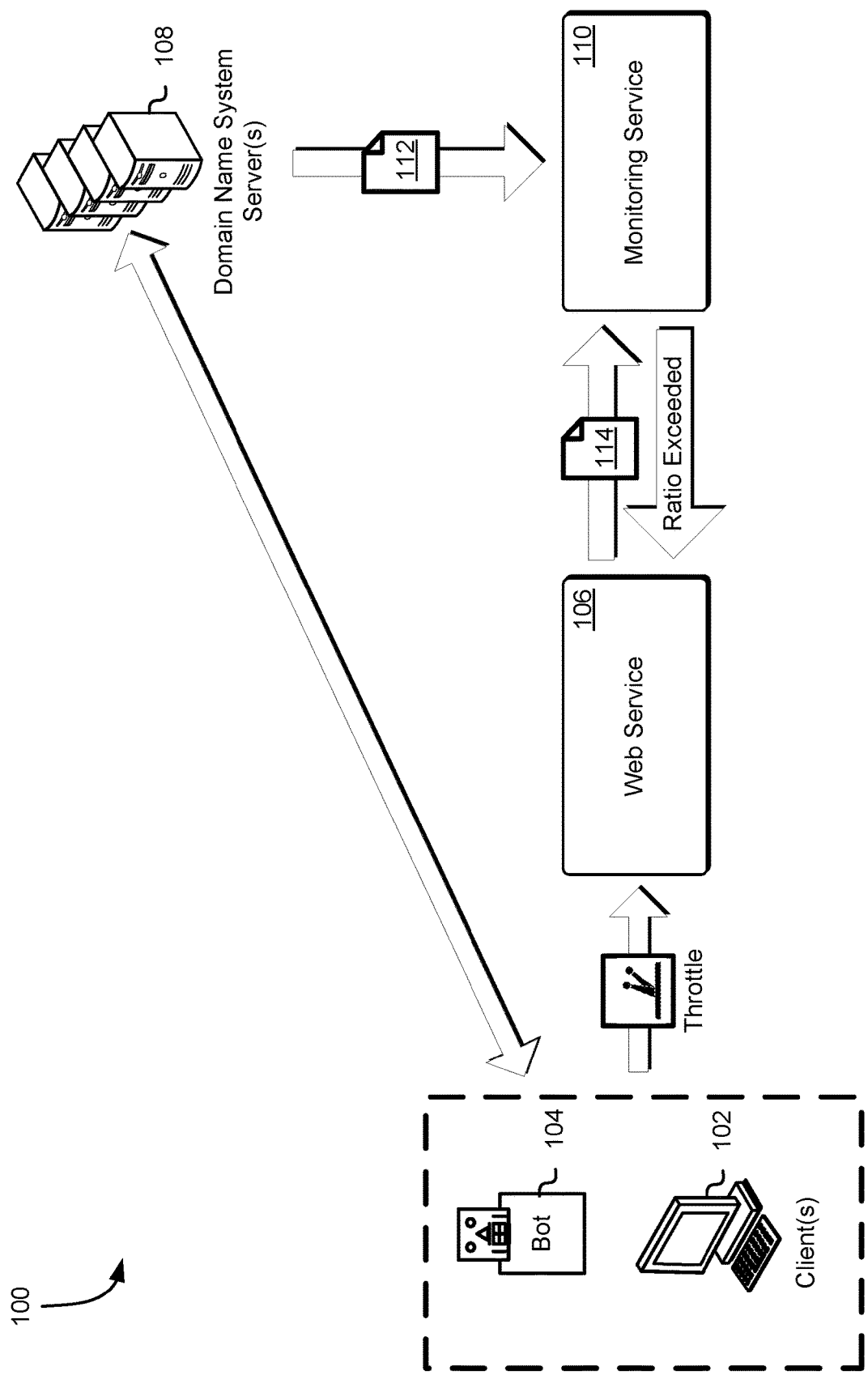
FIG. 1 shows an illustrative example of an environment in which various embodiments can be implemented.

This patent application relates to the early detection of a DDoS attack based on the frequency at which requests are received at a DNS service to obtain an Internet Protocol (IP) of a web service that provides access to a website and the frequency at which requests are received at the web service to access the website. In an example, a monitoring service obtains request data from a DNS service for a particular website provided by a web service. The request data specifies requests received by the DNS service to provide an IP address corresponding to a Uniform Resource Identifier (URI) corresponding to a resource, such as a website provided by the web service. Additionally, the monitoring service may obtain request data from the web service. The request data from the web service specifies the requests received by the web service to access the website or other resources provided by the web service. The monitoring service may use the request data from the DNS service and from the web service to determine the frequencies at which requests are received over time. The monitoring service may use these frequencies to calculate a baseline request ratio of the incoming requests received by the web service to access the website to the incoming requests received by the DNS service to obtain the IP address of the website.

In some examples, the monitoring service obtains request data from the DNS service and the web service to determine whether the ratio of requests received by the web service relative to the requests received by the DNS service exceeds the baseline request ratio for the website. The monitoring service may evaluate the request data to identify any requests corresponding to administrators and other entities authorized to perform tests on the website. For instance, the monitoring service may identify requests originating from clients having an IP address within a particular range corresponding to these administrators or other entities. Alternatively, the requests may include a shared secret that the monitoring service may use to identify the requests made by the administrators or other entities to the DNS service and to the web service to access the website. The monitoring service may disregard any requests from the administrators and other entities authorized to perform tests on the website and calculate a request ratio based on the remaining requests identified in the request data.

If the monitoring service determines that the request ratio exceeds the baseline request ratio by a threshold margin defined by an administrator of the web service or by the monitoring service, the monitoring service may determine that there is an incoming DDoS attack targeting the website. In some examples, if the monitoring service detects an incoming DDoS attack, the monitoring service transmits a request to the DNS service to associate the URI of the website with an IP address corresponding to a CDN service capable of mitigating DDoS attacks. The CDN service may include various mechanisms for preventing attempts to overwhelm a particular website while permitting valid network traffic to reach the web service to access the website. Alternatively, the monitoring service may transmit a notification to an administrator or other entity authorized to manage the web service or the website itself to indicate that a DDoS attack is imminent or in progress. This may enable the administrator or other entity to perform any actions to mitigate the impact of the DDoS attack, such as redirecting network traffic directed to the website to a CDN service capable of mitigating DDoS attacks or engaging security features at the web service to prevent automated access to the website.

In this manner, a monitoring service may detect an incoming DDoS attack on a particular website or resource provided by a web service and mitigate the impact of the DDoS attack. In addition, the techniques described and suggested in this disclosure enable additional technical advantages. For instance, because the monitoring service utilizes shared secrets or a range of IP addresses to identify requests used for performing a stress test or other evaluation of the website, the monitoring service may ignore these requests and prevent a false positive detection of an incoming DDoS attack to the website. Thus, an administrator of the web service or of the website itself may conduct a stress test on the website without risk of the test being interrupted as a result of the monitoring service falsely detecting a DDoS based on the test being performed.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a monitoring service 110 evaluates incoming DNS request data 112 and web service request data 114 to determine whether there is an impending DDoS attack targeting a website accessible via a web service 106. A web service 106 may include one or more computing systems or devices that enable other computer systems, such as client devices (e.g., laptops, personal computers, smartphones, etc.), to establish a communications channel with the web service 106 to access one or more resources provided by the web service 106. For instance, a client device 102 may transmit a request to the web service 106 to establish a communications channel between the client device 102 and the web service 106 to access a particular website offered by the web service 106. The client device 102 may submit an application layer (e.g., HyperText Transfer Protocol Secure (HTTPS), file transfer protocol, etc.) request to the web service 106 to establish a secure network communications channel, such as a Transport Layer Security/Secure Sockets Layer (TLS/SSL) secure channel.

The client device 102 may be a computer system that may include one or more applications installed on the computer system configured to access and communicate with the web service 106. The client device 102 may communicate with the web service 106 through one or more communications networks, such as the Internet. The client device 102 may specify, for the secure network communications session to be established, negotiable features (e.g., cipher suites, etc.) that may be utilized by the web service 106 to communicate with the client device 102 through the secure communications channel. While user-agents and cipher suites are used extensively throughout the present disclosure for the purpose of illustration, other information relating to the client device 102 and the communications channel, including other attributes of the client and other features may be used.

In some embodiments, the client device 102 utilizes, via a browser application or other application installed on the client device 102, a URI of a website or other resource provided by the web service 106 to establish the communications channel with the web service 106 and access the website. The client device 102, via the browser application or other application installed on the client device 102, transmits a query over a communications network to identify the service or resource corresponding to the URI of the website entered into the application. The query may be received by a recursive resolver, which may be operated by a service provider (e.g., Internet Service Provider (ISP), mobile device carrier service provider, etc.) and may redirect the query to one or more DNS servers 108 that may provide a response to the query. The DNS servers 108 may include a root server that resolves the top level domain specified in the URI (e.g., .com, .net, .org, .info, etc.). This root server may also store the address information for second level domains within the top level domain specified in the URI. Thus, the root server may identify a domain's name server within the DNS servers 108 that can resolve the query from the client device 102. The recursive resolver may transmit the query to the domain's name server to obtain the IP address for the full domain specified in the URI. In response to receiving the IP address for the domain name in the URI, the recursive resolver may provide the IP address to the browser application of the client device 102, which may use the IP address to transmit the request to the web service 106 to access the website or other resource provided by the web service 106. While DNS servers 108 are used throughout the present disclosure for the purpose of illustration, other servers and services may utilized. For instance, a service that resolves identifiers to obtain a network address of the web service 106 may be utilized in place of or in addition to the DNS servers 108.

In an embodiment, the DNS servers 108 receiving queries from client devices 102 and other computing devices to obtain an IP address for the domain name specified in a URI record request data 112 corresponding to these queries. The DNS server request data 112 may specify, for each query received, the domain name specified query, the IP address provided in response to the query, a timestamp corresponding to when the query was received, and an IP address of the client device 102 or other computing device from which the query originated. In some instances, the DNS server request data 112 may specify a shared secret provided in the query from a client device 102. This shared secret may be provided by the monitoring service 110 or the web service 106 to an administrator or other entity authorized to test the performance of the web service 106. The shared secret may be specified in the DNS server request data 112 in an entry corresponding to the query that included the shared secret. The monitoring service 110 may utilize the shared secret to determine whether the query originated from an administrator or other entity authorized to test the performance of the web service 106.

Additionally, the web service 106 may record request data 114 corresponding to requests to access a particular website or resource provided by the web service 106. For instance, in response to a request to establish a communications channel to access the web service 106 and the website or resource provided by the web service 106, the web service 106 may record request data 114 corresponding to the request. The data may specify an IP address of the client device 102 or other computing device that submitted the request, an identifier corresponding to the website or resource being accessed, and a timestamp corresponding to when the request was received by the web service 106. In some embodiments, the request can include a shared secret. This shared secret may be similar or identical to the shared secret described above, which may be provided to an administrator or other entity authorized to test the performance of the web service 106. The monitoring service 110 may similarly utilize the shared secret specified in the web service request data 114 to determine whether the request to access the website or other resource provided by the web service 106 originated from an administrator or other entity authorized to test the performance of the web service 106.

In some embodiments, an administrator or other entity authorized to test the performance of the web service 106 is provided with a cryptographic key and a shared secret, which the administrator or other entity may use as inputs to a cryptographic hash function to obtain a hash. This hash may be provided in requests submitted by the administrator or other entity and, as a result, may be specified in the request data 114. The monitoring service 110 may obtain any entries that include a hash. Further, the monitoring service 110 may utilize the cryptographic key and the shared secret as inputs to a cryptographic hash function to generate a second hash. If the hash and the second hash are identical, the monitoring service 110 determines that the shared secret is valid and that the request originated from an administrator or other entity authorized to test the performance of the web service 106. Numerous variations of cryptographic methods may utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one-way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

The monitoring service 110 includes one or more computer systems that evaluate incoming network traffic to the web service 106 to identify any issues that may impact the performance of the web service 106. For instance, the monitoring service 110 may evaluate the web service request data 114 from the web service 106 to identify any malicious attacks directed towards the web service 106, latency issues in responding to client requests, service outages, and the like. If the monitoring service 110 identifies any issues that may impact the performance of the web service 106, the monitoring service 110 may perform one or more remedial actions, as described below, to address these issues. It should be noted that while the monitoring service 110 may operate as a standalone service, such as illustrated in FIG. 1, the monitoring service 110 may be part of the web service 106 itself.

In an embodiment, the monitoring service 110 obtains the DNS server request data 112 and the web service request data 114 from the DNS service and the web service 106, respectively. Using the DNS server request data 112 and the web service request data 114, the monitoring service 110 determines a frequency at which requests to obtain an IP address corresponding to a particular URI are received and a frequency at which requests to access the web service 106 are received over a period of time. Using these frequencies, the monitoring service 110 may calculate a baseline request frequency ratio. For instance, the monitoring service 110 may determine the ratio based at least in part on the number of incoming requests to the web service 106 relative to the number of incoming requests to the DNS servers 108 to obtain the IP address of the web service 106. The monitoring service 110 may obtain the DNS server request data 112 and the web service request data 114 over time to update the baseline request frequency ratio if the frequency at which requests are received do not result in an increase of the ratio that goes beyond a ratio increase threshold established by the monitoring service 110 via input by an administrator of the web service 106 or of the monitoring service 110 itself. It should be noted that while a baseline request frequency ratio is used extensively throughout the disclosure for the purpose of illustration, the monitoring service 110 may utilize a range for the ratio of incoming requests to the web service 106 and to the DNS servers 108. Alternatively or in addition, the monitoring service 110 may evaluate the rate at which the ratio is increasing to determine whether there is an issue with the web service 106. For instance, the monitoring service 110 may model the request frequency ratio as a continuous function and calculate the derivative of the model to determine the rate of increase for the request frequency ratio.

In some embodiments, the monitoring service 110 obtains the web service request data 114 from various proxy servers and other frontend servers that may process incoming requests to access the website. For instance, the website may have multiple IP addresses (e.g., multiple redundant frontend servers in different geographic areas, etc.) which may be provided by the DNS servers 108. In response to a request, a proxy or frontend server may access the web service 106 to obtain data that can be used to fulfill the request. Each of these proxy and frontend servers may maintain a log that specifies request data corresponding to requests received by the servers. The monitoring service 110 may obtain this request data from the proxy and frontend servers and aggregate this request data to obtain the web service request data 114.

In some instances, a web service 106 may be subject to potential DDoS attacks from one or more bots 104. A bot 104 may include one or more computer systems or software installed on one or more computer systems that is designed to automate certain operations on behalf of users of the one or more computer systems. A bot 104 may be part of a botnet, which may comprise a group of computer systems that collectively perform operations on behalf of users. In some cases, the botnet may perform these operations without the knowledge of these users. For example, a third party may infect these one or more computer systems with malicious software (malware) that may permit the third party to execute automated processes on these computer systems without the knowledge of the users of the computer systems. Botnets may be used to execute a DDoS attack on a web service 106 to disrupt operation of the web service 106 for a period of time. For instance, a botnet may saturate the web service 106 with an inordinate number of requests with the purpose of overloading the web service's servers.

The computing devices that are utilized in the botnet (e.g., bots 104) may submit an initial query to the DNS servers 108 to obtain the IP address of the web service 106. Once the botnet has obtained the IP address of the web service 106, the bots 104 may submit a large number of requests to the web service 106 at a higher frequency than that of a standard client device 102. Alternatively, the bots 104 may obviate sending a query to the DNS servers 108 and instead transmit a large number of requests directly to the web service 106 via a known IP address or as a result of selecting the IP address of the web service 106 at random. As the initial requests from the bots 104 are received, the web service 106 may record these requests in the form of the web service request data 114. Similarly, if the DNS servers 108 receive any requests from the bots 104, the DNS servers 108 may record these requests in the form of the DNS server request data 112.

The monitoring service 110 may evaluate the DNS server request data 112 and the web server request data 114 at certain intervals to detect significant changes to the ratio of incoming requests to the web service 106 to requests made to the DNS servers 108. For instance, the monitoring service 110 may obtain the request data 112, 114 every minute, every hour, etc. to identify any potential variance in the ratio. Alternatively, the monitoring service 110 may evaluate the DNS server request data 112 and the web server request data 114 in response to a triggering event. For instance, the monitoring service 110 may evaluate the request data 112, 114 after each N requests to the web service 106 is made or after N bytes of data have been logged by the web service 106 as a result of the requests. Thus, as the number of requests processed by the web service 106 increase, the monitoring service 110 may increase its rate of evaluation. The monitoring service 110 may calculate the current ratio of incoming requests to the web service 106 relative to the DNS servers 108 and compare this ratio to the baseline request frequency ratio to determine whether the newly calculated ratio exceeds a maximum threshold variance for the baseline request frequency ratio. For example, if the newly calculated ratio represents a greater than three-fold increase from the baseline request frequency ratio, the monitoring service 110 may determine that the newly calculated ratio exceeds the maximum threshold variance for the baseline request frequency ratio. Similarly, if the rate of increase of the request frequency ratio exceeds a maximum threshold rate of increase, the monitoring service 110 may identify a potential issue with the web service 106.

In an embodiment, if the monitoring service 110 determines that the newly calculated ratio exceeds the maximum threshold variance for the baseline request frequency ratio, the monitoring service 110 transmits a request to a DNS service to redirect network traffic from the web service 106 to one or more CDN services that can mitigate an incoming DDoS attack while enabling valid network traffic to reach the web service 106. The one or more CDN services may provide one or more proxy servers that may be deployed by the CDN services to distribute content from the web service 106 to users requesting access to the web service 106. For instance, in response to a request to access the web service 106, a proxy server of a CDN service may obtain data from the web services 106 that may be provided to the client. These one or more CDN services may mitigate DDoS attacks by rejecting requests originating from suspicious IP addresses or throttling access to the resources provided by the web service 106. In some instances, the monitoring service 110 may submit a request to the DNS service to provide, at a greater frequency, the IP addresses of these CDN services to increase the amount of network traffic being directed to the CDN services while reducing or eliminating the network traffic directed to other proxy servers and network traffic directly to the web service 106 directly.

In an alternative embodiment, the monitoring service 110 transmits a notification indicating a potential DDoS attack if the newly calculated ratio exceeds the maximum threshold variance for the baseline request frequency ratio. The notification may specify the one or more IP addresses of suspected bots 104 attempting to submit a large number of requests to the web service 106, as well as the frequency at which these requests are being received. The notification may be transmitted to an administrator or other entity authorized to monitor performance of the web service 106. Alternatively, the notification may be transmitted to the CDN services and other proxy servers that may be responsible for providing content from the web service 106 to clients. A recipient of the notification may perform any of the operations described above, including redirecting network traffic to CDN services that may be equipped to mitigate DDoS attacks. Further, a recipient of the notification may block requests originating from IP addresses corresponding to suspected bots 104. This may reduce the frequency at which requests are received and mitigate the DDoS attack.

Figure 2:
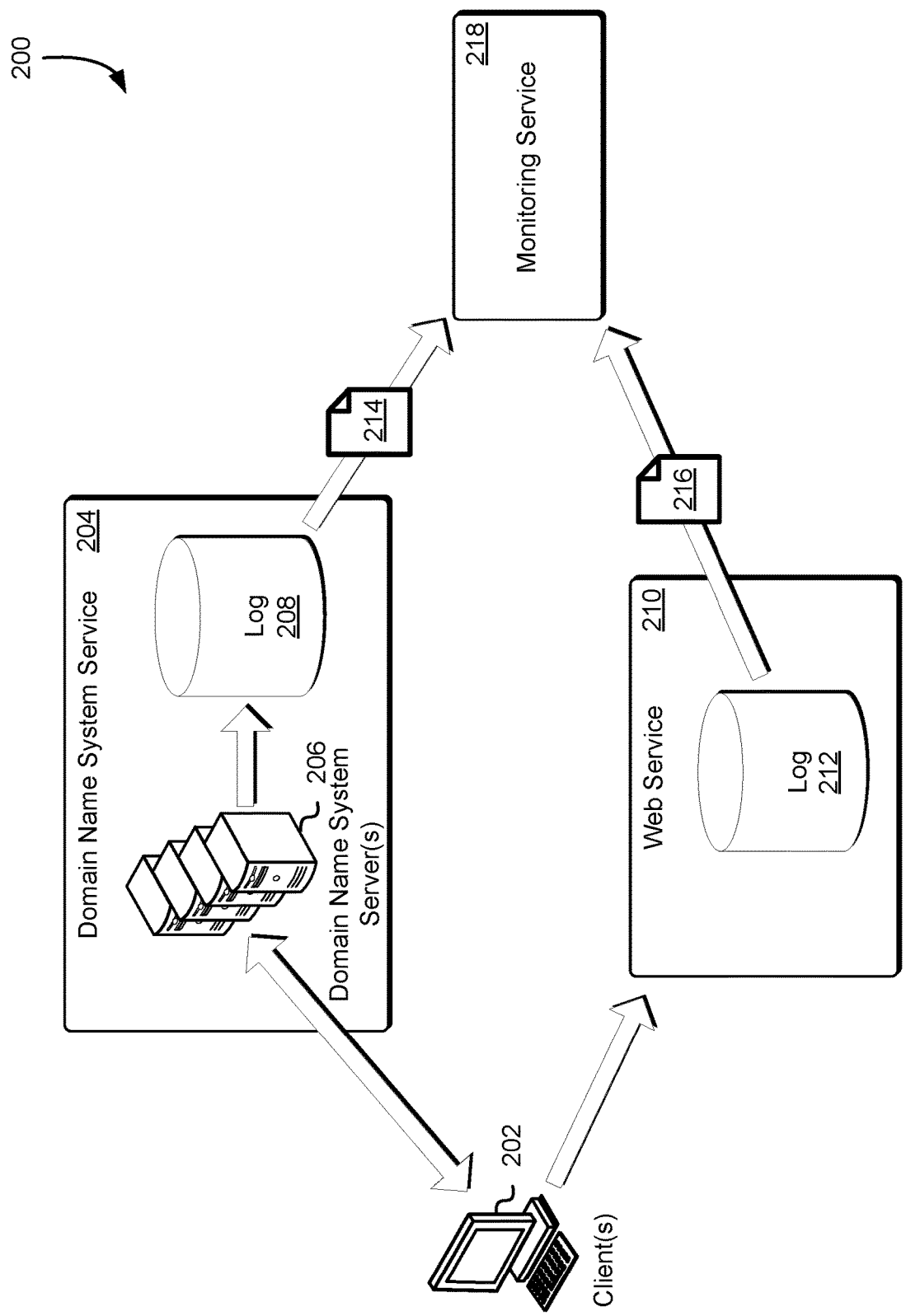
FIG. 2 shows an illustrative example of an environment in which a monitoring service utilizes request data from a Domain Name System (DNS) service and from a web service to generate a baseline request ratio for detecting potential DDoS attacks in accordance with at least one embodiment.

As noted above, a monitoring service may obtain DNS server request data and web service request data from a DNS service and a web service, respectively, to calculate a baseline request frequency ratio that can be used as a baseline for identifying potential DDoS attacks or other Denial of Service (DoS) attacks from bots and other entities. The DNS server request data may be generated by the DNS service in response to queries from clients to obtain an IP address corresponding to a domain name specified in a URI of a website or other resource made available by the web service. Similarly, the web service request data may be generated in response to requests from clients to access the website or other resource. The requests may be received by the web service itself, a proxy server, or a CDN service configured to provide access to the website or other resource on behalf of the web service. Accordingly, FIG. 2 shows an illustrative example of an environment 200 in which a monitoring service 218 utilizes request data from a DNS service 204 and from a web service 210 to generate a baseline request frequency ratio for detecting potential DDoS attacks in accordance with at least one embodiment.

In the environment 200, a client 202, via a browser application or other application installed on the client 202, transmits a query over a communications network to identify the service or resource corresponding to the URI of the website entered into the browser application. The query may be received by a recursive resolver, which may redirect the query to one or more DNS servers 206 of the DNS service 204 for a response to the query. The recursive resolver may obtain, from the DNS servers 206, the IP address for the full domain specified in the URI. In response to receiving the IP address for the domain name in the URI, the recursive resolver may provide the IP address to the browser application of the client 202, which may use the IP address to transmit the request to the web service 210 to access the website or other resource provided by the web service 210.

In an embodiment, the DNS servers 206 record request data corresponding to the queries to obtain an IP address corresponding to a domain into a log 208 of the DNS service 204. The log 208 may include a database or other data store comprising entries for each query processed by the DNS servers 206. For instance, the database or other data store in the log 208 may specify, for each query received, the domain name specified query, the IP address provided in response to the query, a timestamp corresponding to when the query was received, and an IP address of the client 202 or other computing device from which the query originated. In some instances, the log 208 may specify a shared secret provided in the query from a client device 202. This shared secret may be provided by the monitoring service 218 or the web service 210 to an administrator or other entity authorized to test the performance of the web service 210. The shared secret may be specified in the log 208 in an entry corresponding to the query that included the shared secret. The monitoring service 218 may utilize the shared secret to determine whether the query originated from an administrator or other entity authorized to test the performance of the web service 210.

Additionally, the web service 210 may record information regarding requests received by the web service 210, by a proxy server, or by any CDN service configured to provide content from the web service 210 in a log 212 maintained by the web service 210. For instance, in response to a request to establish a communications channel to access the web service 210 and the website or resource provided by the web service 210, the web service 210 may record request data corresponding to the request in the log 212. Each entry in the log 212 may specify an IP address of the client 202 or other computing device that submitted the request, an identifier corresponding to the website or resource being accessed, and a timestamp corresponding to when the request was received by the web service 210, proxy server, or CDN service. In some embodiments, the request can include a shared secret, as described above.

At any time, the monitoring service 218 may transmit a request to the DNS service 204 to obtain the DNS server request data 214 stored within the log 208. Similarly, the monitoring service 218 may transmit a request to the web service 210 to obtain the web service request data 216 stored within the log 212. The monitoring service 218 may evaluate the obtained request data 214, 216 to determine the number of incoming requests to access the web service 210 and the number of incoming requests to obtain an IP address corresponding to a domain name specified in a URI for the web service 210. The monitoring service 218 may utilize these numbers to calculate a baseline request frequency ratio that can be used as a baseline for identifying potential DDoS attacks or other DoS attacks from bots and other entities. The monitoring service 218 may store the calculated baseline request frequency ratio in a data store accessible by the monitoring service 218 for reference.

As the DNS service 204 and the web service 210 process incoming requests, the DNS service 204 and the web service 210 may update their respective logs 208, 212 to create new entries for each request received. The monitoring service 218 may periodically access these logs 208, 212 to obtain any new request data 214, 216 made available by the DNS service 204 and the web service 210. For instance, the monitoring service 218 may obtain the request data 214, 216 at regular time intervals (e.g., every second, every minute, every hour, etc.). The monitoring service 218 may use the new request data to calculate an updated ratio for the frequency of incoming requests received by the DNS service 204 and the web service 210. In an embodiment, the monitoring service 218 compares the updated ratio to the baseline request frequency ratio to determine whether the updated ratio exceeds a baseline request frequency ratio threshold established by an administrator of the monitoring service 218 or of the web service 210. If the updated ratio exceeds this threshold, it may serve as an indication of an impending DDoS or other DoS attack directed towards the web service 210. The monitoring service 218 may transmit a request to the DNS service 204 to provide, in response to queries to obtain an IP address corresponding to the domain name specified in a URI for the web service 210, an IP address of a CDN service or other service that can mitigate the incoming DDoS attack. Similarly, the monitoring service 218 may transmit a request to the web service 210 to redirect network traffic directed towards the web service 210 to a particular CDN service.

In an alternative embodiment, if the updated ratio exceeds the baseline request frequency ratio threshold, the monitoring service 218 generates a notification specifying that there is an impending DDoS attack directed at the web service 210. The notification may specify the IP addresses of the suspected bots engaged in the DDoS attack, as well as the frequency at which the requests are being received and any unique characteristics of these requests. The monitoring service 218 may transmit the notification to an administrator of the web service 210 or to the web service 210 itself to perform any remedial operations to reduce the impact of the DDoS attack. This may include blocking or throttling any requests from the specified IP addresses, redirecting requests from these IP addresses to a specific CDN service that can mitigate the impact of a DDoS attack, and the like.

In some instances, an administrator of the web service 210 may want to conduct a stress test on the web service 210. The stress test may involve submitting a large number of requests to the web service 210 to determine how the web service 210 handles these requests and to make any changes to the web service 210 based at least in part on the results of the stress test. In an embodiment, in order to prevent such a stress test being categorized as a DDoS attack by the monitoring service 218, the monitoring service 218 provides administrators of the web service 210 or other entities authorized to perform a stress test on the web service 210 with a shared secret that may be used to identify requests originating from these entities. The shared secret may include a password, a passphrase, a particular numerical code, or an array of randomly chosen bytes that may be known to the monitoring service 218 and these entities. An administrator or other entity authorized to perform a stress test on the web service 210 may generate a hash using the shared secret and a cryptographic key provided by the monitoring service 218 as input to a cryptographic hashing algorithm specified by the monitoring service 218 and provide the hash in its requests to the DNS service 204 and the web service 210. The DNS service 204 and the web service 210 may record the hash in their respective logs 208, 212 such that entries corresponding to requests made by the administrator or other entity authorized to perform the stress test include the hash. The monitoring service 218 may identify, from the request data 214, 216, the entries that include the hash. The monitoring service 218 may use the shared secret and the cryptographic key as input to the cryptographic hashing algorithm to generate its own hash. If the hash specified in the entry matches the hash generated by the monitoring service 218, the monitoring service 218 may disregard these entries in the request data 214, 216 such that these entries are not considered in the calculation of the request frequency ratio.

In an alternative embodiment, the monitoring service 218 maintains a record of IP addresses corresponding to administrators and other entities authorized to test the web service 210. If the monitoring service 218 identifies an entry within the request data 214, 216 originating from an IP address corresponding to an administrator or other entity authorized to test the web service, the monitoring service 218 may disregard the entry, as the request originated from a trusted source. Thus, entries corresponding to these IP addresses may be disregarded in the calculation of the request frequency ratio. Alternatively, the monitoring service 218 may transmit a notification specifying these trusted IP addresses to the web service 210 and the to the DNS service 204 to cause the web service 210 and the DNS service 204 to omit entries corresponding to requests from these IP addresses from the their respective logs 208, 212. Thus, the request data 214, 216 may include entries corresponding to IP addresses not identified as being trusted by the monitoring service 218.

Figure 3:
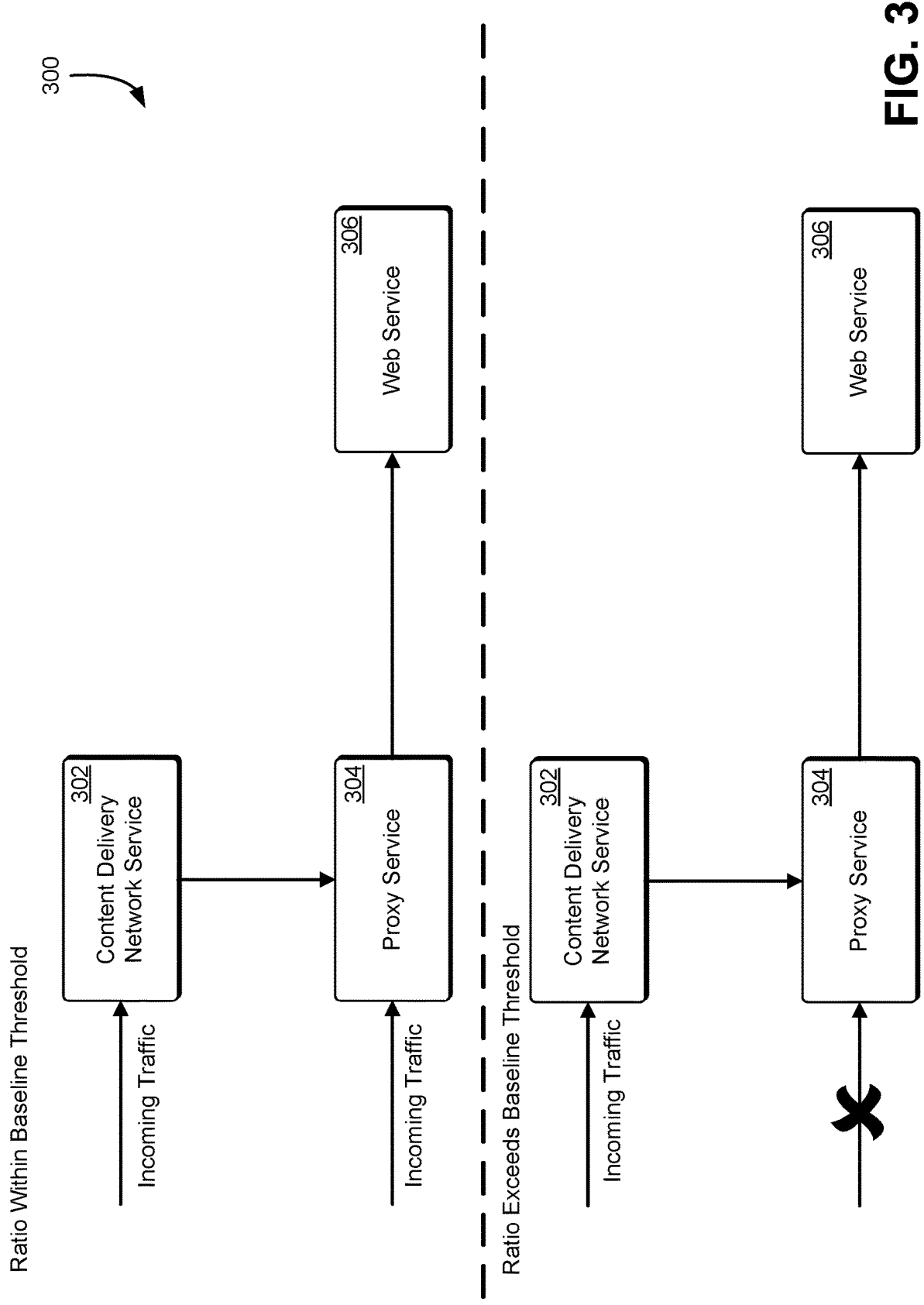
FIG. 3 shows an illustrative example of an environment in which network traffic is redirected in response to detection of a potential DDoS attack in accordance with at least one embodiment.

As noted above, if the monitoring service determines, based at least in part on a request frequency ratio for requests received by the DNS service and the web service (including the CDN services and proxy servers operating on behalf of the web service), that there is an impending DDoS attack directed towards the web service, the monitoring service may submit a request to the DNS service and to the web service to redirect incoming network traffic to one or more CDN services or other services that can mitigate the impact of a DDoS attack. Further, the monitoring service may cause the web service and the DNS service to automatically reject requests from IP addresses corresponding to suspected bots or other malicious users. Accordingly, FIG. 3 shows an illustrative example of an environment 300 in which network traffic is redirected in response to detection of a potential DDoS attack in accordance with at least one embodiment.

In the environment 300, a web service 306 may utilize at least a CDN service 302 and a proxy service 304 to process incoming network traffic directed towards the web service 306. The proxy service 304 may provide one or more proxy servers that may receive network traffic from clients and redirect that network traffic to the web service 306. The web service 306 may utilize the CDN service 302 and the proxy service 304 as entry points to the web service 306. In some instances, the web service 306 may transmit a request to a DNS service to provide the IP addresses of the CDN service 302 and the proxy services provided by the proxy service 304 and to define a proportion at which network traffic should be directed to the CDN service 302 and the proxy servers of the proxy service 304.

The DNS service and the web service 306 may provide request data to a monitoring service, which may use the request data to establish a baseline request frequency ratio of the requests received by the web service 306, via the CDN network service 302 and the proxy service 304, and the requests received by the DNS service over a period of time. The monitoring service may utilize this baseline request frequency ratio as a benchmark for determining whether an increase in the number of requests processed by the CDN network service 302 and the proxy service 304 is indicative of a potential DDoS or other DoS attack. For example, the monitoring service may periodically or in response to a triggering event (e.g., in response to a request from the web service 306 or an administrator, detection of an elevated number of requests, receipt of a warning or threat from a third-party, etc.) receive request data from the DNS service and the web service 306 to calculate a new request frequency ratio. The monitoring service may compare the newly calculated request frequency ratio to the baseline request frequency ratio to determine whether the newly calculated request frequency ratio exceeds the baseline by a maximum threshold value. If so, the monitoring service may determine that there is a potential DDoS attack.

To address the potential DDoS attack, the monitoring service, on behalf of the web service 306, may transmit a request to the DNS service to redirect network traffic to the CDN service 302 or to another service that can mitigate the DDoS attack, while preventing network traffic from being received by the proxy servers of the proxy service 304. Similarly, the monitoring service may transmit a notification to the web service 306 to indicate that a potential DDoS attack has been detected by the monitoring service. The notification may indicate where the DDoS attack is directed. For instance, as illustrated in FIG. 3, the DDoS attack may be directed towards the proxy service 304. In response to the notification, the web service 306 may transmit a request to the DNS service to redirect network traffic away from the proxy service 304 such that network traffic is directed towards the CDN service 302 or to another service that is capable of mitigating DDoS attacks. Thus, any network traffic being directed towards the target of a DDoS attack may be blocked by disabling network access to the affected target. If the DDoS attack is redirected towards the CDN service 302 or other service designated by the web service 306, the CDN service 302 or other service may mitigate the impact of the attack as these services may include the resources usable to perform such mitigation.

Figure 4:
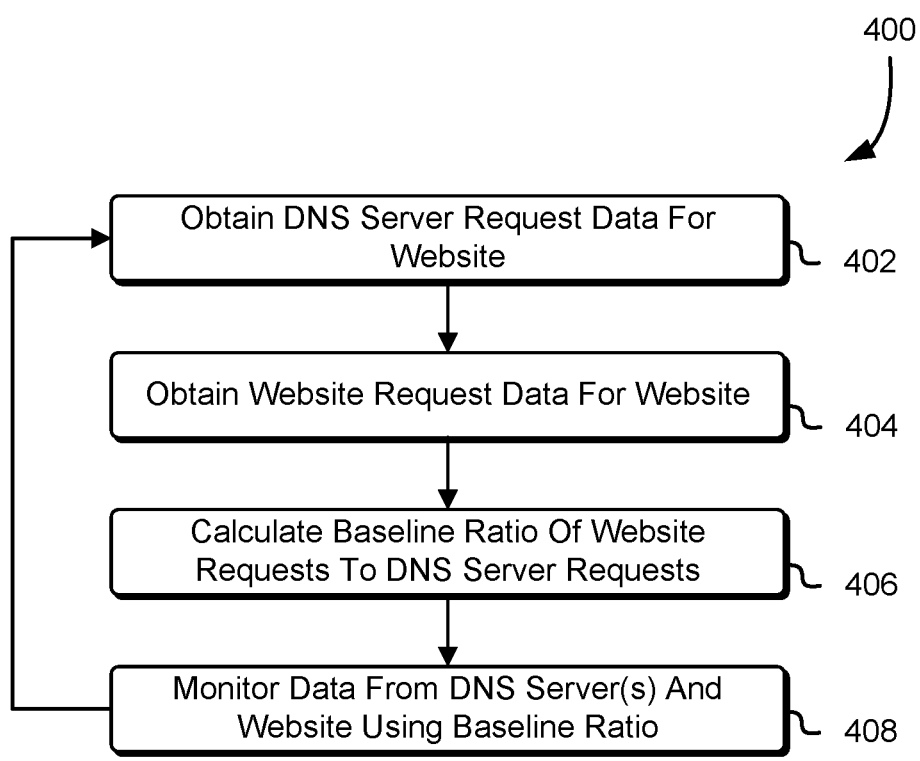
FIG. 4 shows an illustrative example of a process for calculating a baseline request ratio based at least in part on request data corresponding to a website and obtained from a DNS service and a web service in accordance with at least one embodiment.

As noted above, the monitoring service may use request data from the DNS service and from the web service to calculate a baseline request frequency ratio that can be used as a benchmark for determining whether the web service is the target of a potential DDoS or other DoS attack. The monitoring service may update the baseline request frequency ratio over time as requests are processed by the DNS service and the web service. Thus, the monitoring service may maintain a range for the baseline request frequency ratio and establish a maximum threshold that, if exceeded, would indicate a potential DDoS or other DoS attack. Accordingly, FIG. 4 shows an illustrative example of a process 400 for calculating a baseline request ratio based at least in part on request data corresponding to a website and obtained from a DNS service and a web service in accordance with at least one embodiment. The process 400 may be performed by the aforementioned monitoring service, which may communicate with the DNS service and the web service to obtain the request data usable to calculate the baseline request frequency ratio.

To initiate monitoring of the requests received by the DNS service and the web service to determine whether the web service is the target of a potential DDoS attack, the monitoring service may determine a baseline range for the request frequency ratio of incoming requests relative to the web service to incoming requests to the DNS service to obtain an IP address corresponding to a domain name of the web service. To determine this baseline range, the monitoring service may obtain 402 the DNS server request data for the particular website or resource offered by the web service. The DNS server request data may include an entry corresponding to each request processed by the DNS service to obtain an IP address for a particular domain name. Each entry may also specify the timestamp indicating the time at which the request was received by the DNS service, the IP address of the entity that submitted the request, and the IP address provided in response to the request. In some embodiments, an entry can include a shared secret provided by the entity submitting the request. This shared secret may be used by the monitoring service to identify requests made to the DNS service as part of an evaluation of the web service. The monitoring service may verify the shared secret and disregard these entries.

In addition to obtaining the DNS server request data from the DNS service, the monitoring service may obtain 404 the website request data for the website or other resource from the web service. The website request data may similarly include an entry corresponding to each request processed by the web service and any of the entry points enabled by the web service to access the website or other resource. For instance, each entry may specify an identifier corresponding to the entry point that received the request. The identifier may include the IP address or other network address of the entry point. Further, the entry may specify a timestamp corresponding to the time at which the request was received by the entry point, as well as an IP address of the entity that submitted the request. In some embodiments, an entity can provide, via the request to the web service, a shared secret that may be known to the entity and the monitoring service. This shared secret may be specified in the entry corresponding to the request from the entity. Thus, if the monitoring service verifies that the shared secret is valid, the monitoring service may disregard this entry as originating from a trusted user, which may be performing a stress test or other evaluation of the web service.

Using the obtained DNS server request data and the website request data, the monitoring service may calculate 406 the baseline request frequency ratio for the website. As mentioned above, the monitoring service may disregard any entries that specify a valid shared secret, as these entries may correspond to trusted users or other entities performing an evaluation of the web service and, thus, may not be considered for detecting a potential DDoS attack. In some embodiments, the monitoring service evaluates the entries specified in the DNS server request data and in the website request data to determine whether any of these entries specify an IP address of a trusted entity, such as an administrator of the web service or other entity authorized to evaluate the web service. Any entries specifying an IP address of a trusted entity may also be disregarded.

To calculate the baseline request frequency ratio for the website or resource, the monitoring service may determine, from the website request data, the number of entries received by the web service to access the website or other resource over a particular period of time (e.g., in a minute, in an hour, etc.). Additionally, the monitoring service may determine, from the DNS server request data, the number of entries received by the DNS service to obtain an IP address corresponding to a domain name of the website or other resource over the particular period of time. The monitoring service may divide the number of entries received by the web service by the number of entries received by the DNS service over the particular period of time to arrive at the baseline request frequency ratio for the website. In some instances, if the obtained data includes entries over multiple time intervals, the monitoring service may utilize the data to generate a range of baseline request frequency ratios that serve as an indication of typical network traffic directed towards the web service.

The monitoring service may utilize the baseline request frequency ratio to monitor 408 incoming request data from the DNS service and the web service. As will be described in greater detail below, the monitoring service may obtain new request data over time to calculate a new request frequency ratio and compare this new ratio to the baseline request frequency ratio to determine whether the web service is the target of a potential DDoS attack. If the request data does not serve as an indication of a potential DDoS attack, the monitoring service may use the newly obtained request data to refine the baseline request frequency ratio or the range of baseline request frequency ratios to improve the accuracy in detecting potential DDoS attacks.

Figure 5:
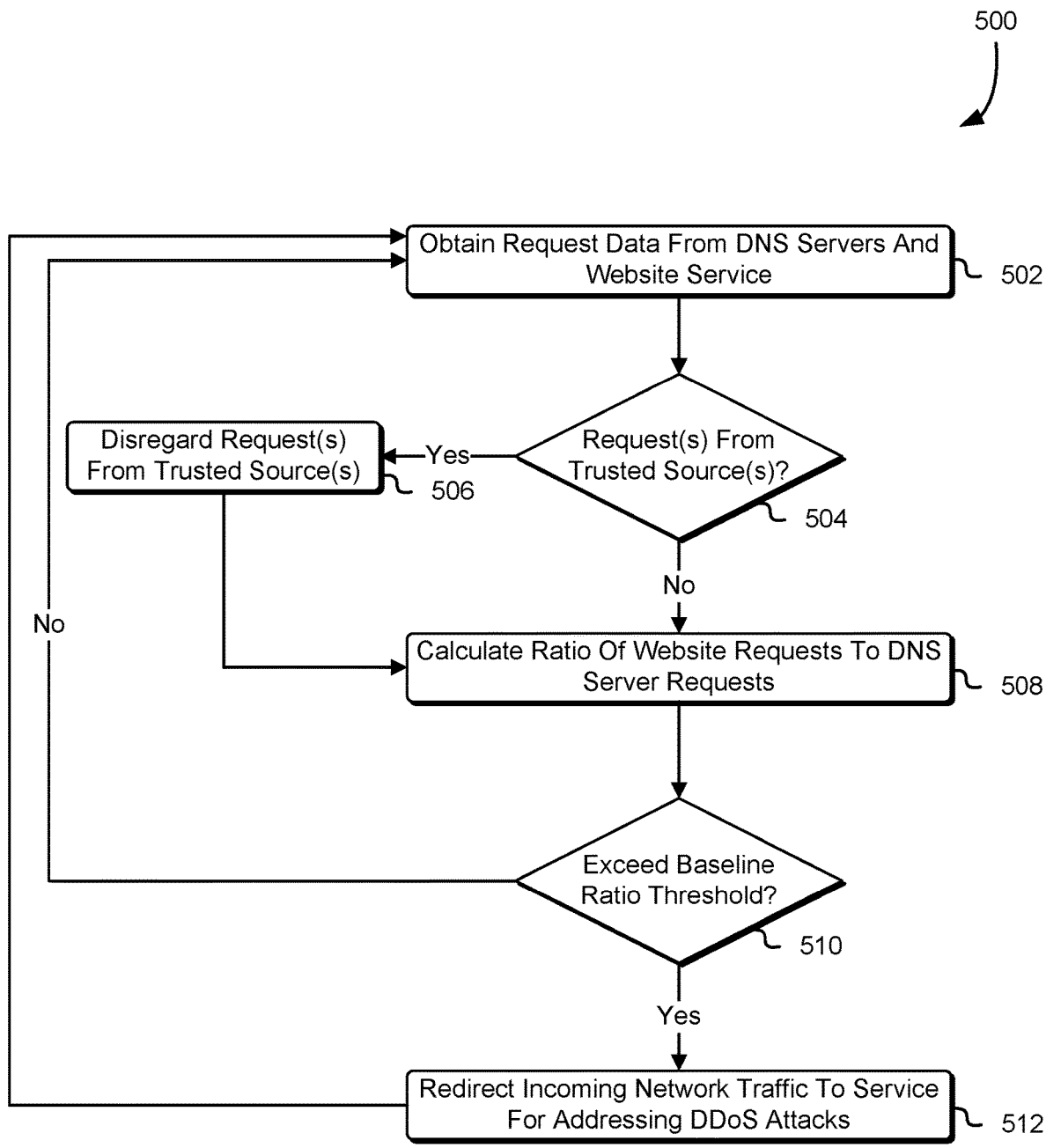
FIG. 5 shows an illustrative example of a process for redirecting network traffic to a Content Delivery Network (CDN) service that can address DDoS attacks in response to a determination that a request ratio exceeds a baseline request ratio for a website in accordance with at least one embodiment.

As noted above, the monitoring service may evaluate request data from the DNS service and the web service to determine whether there are any indications of a potential DDoS or other DoS attack targeted at the web service. For instance, the monitoring service may calculate a request frequency ratio based at least in part on the obtained data and compare this ratio to a baseline request frequency ratio to determine whether the newly calculated request frequency ratio exceeds the baseline by at least a threshold margin. If so, the monitoring service may determine that there is an impending DDoS attack and perform one or more operations to mitigate the impact of the attack. Accordingly, FIG. 5 shows an illustrative example of a process 500 for redirecting network traffic to a CDN service that can address DDoS attacks in response to a determination that a request frequency ratio exceeds a baseline request frequency ratio for a website in accordance with at least one embodiment. The process 500 may be performed by the aforementioned monitoring service, which may obtain request data from the DNS service and the web service to calculate a request frequency ratio for requests to access a particular website or resource and to determine whether this ratio serves as an indication of a potential DDoS or other DoS attack.

The monitoring service may, periodically or in response to a triggering event, transmit a request to the DNS service and to the web service to obtain 502 request data from the DNS service and the web service. As described above, the DNS server request data may include an entry corresponding to each request processed by the DNS service to obtain an IP address for a particular domain name. Similarly, the website request data may include an entry corresponding to each request processed by the web service and any of the entry points enabled by the web service to access the website or other resource.

In some embodiments, one or more entries of the DNS server request data and the web service request data will specify a shared secret known to the monitoring service and one or more trusted entities (e.g., administrators of the web service, users authorized to perform an evaluation of the web service, etc.). Additionally, in some embodiments, the monitoring service maintains a database specifying the IP addresses of trusted entities. The monitoring service may evaluate the received request data to determine 504 whether any entries (e.g., requests) specified in the request data correspond to requests made by a trusted entity. For instance, if the monitoring service identifies an entry in the request data that specifies a shared secret, the monitoring service may determine if the shared secret specified in the entry is valid. If the shared secret is valid, the monitoring service may determine that the entry corresponds to a trusted entity to which the shared secret was provided. The monitoring service may also evaluate each entry to determine whether the IP address or other network address specified in the entry corresponds to a trusted entity. The monitoring service may query its database of trusted entity network addresses to determine whether the network address specified in an entry is specified in the database. If so, the monitoring service may determine that the entry corresponds to a trusted entity.

If the monitoring service identifies one or more entries corresponding to trusted sources, the monitoring service may disregard 506 these entries, as they may be indicative of an ongoing stress test or other evaluation of the web service and not of a DDoS or other DoS attack. Using the remaining entries from the request data, the monitoring service may calculate 508 a request frequency ratio of requests received to access the website or other resource to requests received to obtain an IP address corresponding to the domain name of the website or other resource. For instance, the monitoring service may identify entries received over a particular time interval from a previous calculation and utilize these entries to calculate a new request frequency ratio.

The monitoring service may compare the newly calculated request frequency ratio to the baseline request frequency ratio or to the range of baseline request frequency ratios to determine 510 if the newly calculated request frequency ratio exceeds a maximum threshold. If the newly calculated request frequency ratio does not exceed the maximum threshold, the monitoring service may continue to evaluate request data as it is produced by the DNS service and web service to monitor against potential DDoS attacks. In some embodiments, the monitoring service can use the newly calculated request frequency ratio to refine the baseline request frequency ratio or the range of baseline request frequency ratios to improve the accuracy in detecting potential DDoS or other DoS attacks.

If the monitoring service determines that the newly calculated request frequency ratio exceeds the maximum threshold for the baseline request frequency ratio, the monitoring service may redirect 512 incoming network traffic directed towards the entry points of the web service to a CDN service or other service that can address or at least mitigate potential DDoS attacks. For instance, the monitoring service may transmit a request to the DNS service to cause the DNS service to provide, in response to a request to obtain an IP address or other network address corresponding to the domain name of the web service, an IP address or other network address of the CDN service or other service that can mitigate the potential DDoS attack. This may cause any entity utilizing the URI of the web service to be directed towards the CDN service or other service. Additionally, the monitoring service may prevent network traffic from being processed by other entry points that are the target of the DDoS attacks. Thus, the network traffic may be received by the selected entry point, which may block requests from bots and other malicious users participating in a DDoS attack while processing valid network traffic for the web service.

Figure 6:
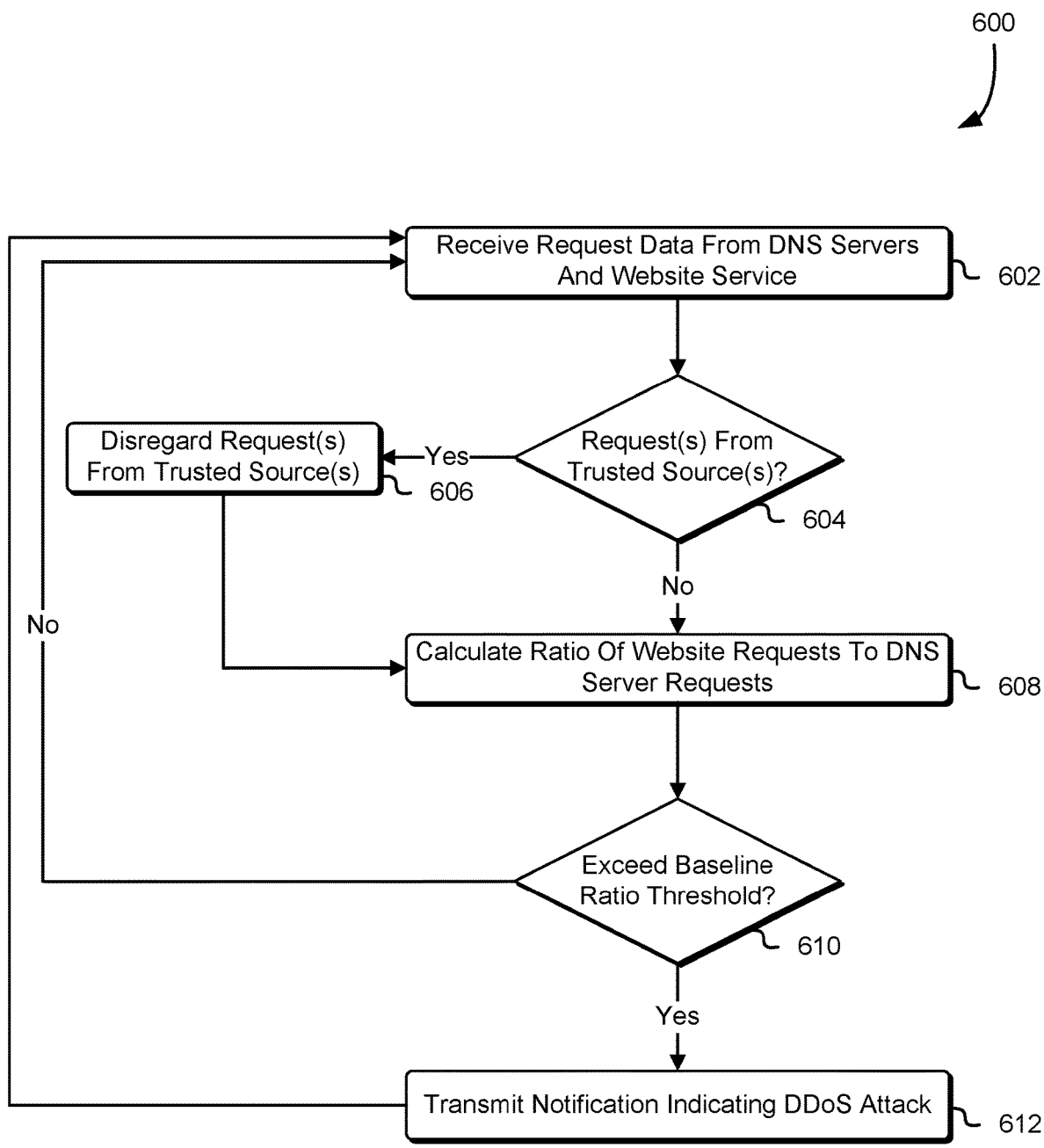
FIG. 6 shows an illustrative example of a process for transmitting a notification indicating an incoming DDoS attack in response to a determination that a request ratio exceeds a baseline request ratio for a website in accordance with at least one embodiment.

As noted above, if the monitoring service determines that the newly calculated request frequency ratio exceeds the maximum threshold for the baseline request frequency ratio, the monitoring service may transmit a notification that indicates a potential DDoS or other DoS attack has been detected. This notification may cause the web service to shut down a server or group of servers that are the target of the potential DDoS or other DoS attack and redirect network traffic to a CDN service or other service that can mitigate the impact of the attack. Accordingly, FIG. 6 shows an illustrative example of a process 600 for transmitting a notification indicating an incoming DDoS attack in response to a determination that a request ratio exceeds a baseline request ratio for a website in accordance with at least one embodiment. The process 600 may be performed by the aforementioned monitoring service, which may calculate a request frequency ratio using request data from the DNS service and web service and use the request frequency ratio to determine whether it exceeds a maximum threshold, which may indicate a potential DDoS attack.

The process 600 may include similar operations to the process 500 described above in connection with FIG. 5. For instance, the monitoring service may, periodically or in response to a triggering event, transmit a request to the DNS service and to the web service to obtain 602 request data from the DNS service and the web service. The monitoring service may evaluate the received request data to determine 604 whether any entries specified in the request data correspond to requests made by a trusted entity. If so, the monitoring service may disregard 606 these entries, as they may be indicative of an ongoing stress test or other evaluation of the web service and not of a DDoS or other DoS attack. Using the remaining entries from the request data, the monitoring service may calculate 608 a request frequency ratio of requests received to access the website or other resource to requests received to obtain an IP address corresponding to the domain name of the website or other resource. The monitoring service may compare the newly calculated request frequency ratio to the baseline request frequency ratio or to the range of baseline request frequency ratios to determine 610 if the newly calculated request frequency ratio exceeds a maximum threshold. If the newly calculated request frequency ratio does not exceed the maximum threshold, the monitoring service may continue to evaluate request data as it is produced by the DNS service and web service to monitor against potential DDoS attacks.

If the monitoring service determines that the newly calculated request frequency ratio exceeds the maximum threshold, the monitoring service may transmit 612 a notification indicating a potential DDoS has been detected. The notification may specify the one or more IP addresses or other network addresses of suspected bots attempting to submit a large number of requests to the web service, as well as the frequency at which these requests are being received. The notification may be transmitted to an administrator or other entity authorized to monitor performance of the web service. Alternatively, the notification may be transmitted to the CDN services and other proxy servers that may be responsible for providing content from the web service to clients. A recipient of the notification may perform any of the operations described above, including redirecting network traffic to CDN services that may be equipped to mitigate DDoS attacks. Further, a recipient of the notification may block requests originating from IP addresses corresponding to suspected bots. This may reduce the frequency at which requests are received and mitigate the DDoS attack.

Figure 7:
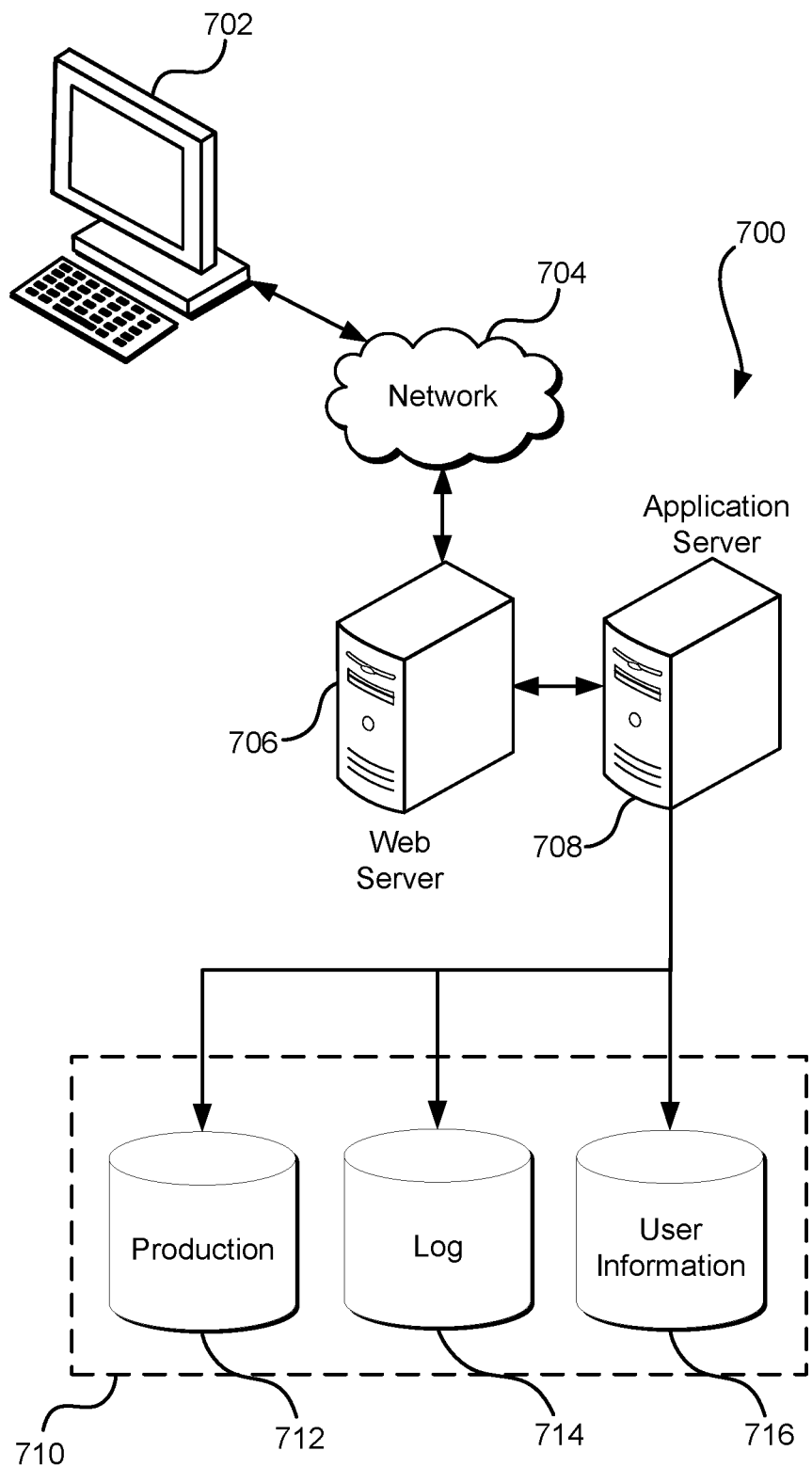
FIG. 7 shows an illustrative example of an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes, and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. The application server 708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving first request data, the first request data specifying a first set of requests received by a domain name system service over a first interval of time and a second set of requests received by a web service for providing a resource over the first interval of time;
determining, based at least in part on the first request data and logs obtained from the web service, a baseline ratio of the second set of requests received by the web service to the first set of requests received by the domain name system service, where the first request data is based at least in part on requests obtained from a set of trusted entities;
receiving second request data, the second request data specifying a third set of second requests received by the domain name system service over a second interval of time having a matching duration as the first interval of time and a fourth set of third requests received by the web service for providing the resource over the second interval of time, where the second request data is based at least in part on requests obtained from the set of trusted entities;
identifying, in the second request data, the set of trusted entities based at least in part on a cryptographic hash generated using a cryptographic key and a shared secret provided to a trusted entity of the set of trusted entities;
calculating, based at least in part on the second request data excluding the requests obtained from the set of trusted entities over the second interval of time, a ratio of the fourth set of third requests received by the web service relative to the third set of second requests received by the domain name system service;
generating a determination, based at least in part on the ratio relative to the baseline ratio where the ratio is calculated such that the calculation does not include a subset of requests of the set of second requests originating from a set of trusted entities, that the ratio is indicative of a distributed denial of service attack;

redirecting network traffic directed towards the web service to one or more computing devices in response to the determination;

identifying, based at least in part on the first request data and the second request data, an internet protocol address corresponding to an entity that caused the ratio to be indicative of the distributed denial of service attack; and providing the internet protocol address corresponding to the entity to a first computing device of the one or more computing devices to cause the first computing device to block network traffic originating from the internet protocol address corresponding to the entity.

2. The computer-implemented method of claim 1, wherein redirecting the network traffic directed towards the web service to the one or more computing devices includes transmitting a request to the domain name system service to associate a domain name of the web service with an internet protocol of the one or more computing devices.

3. The computer-implemented method of claim 1, wherein the computer-implemented method further comprises transmitting a notification to indicate detection of the distributed denial of service attack directed towards the web service.

4. The computer-implemented method of claim 1, wherein the first computing device is a proxy server responsible for blocking the network traffic.

5. A system, comprising at least one computing device configured to implement one or more services, wherein the one or more services:

obtain request data generated as a result of a first set of requests received by a service that resolves an identifier to a set of network addresses for a resource over a first interval of time and a second set of requests received by a web service for providing the resource over the first interval of time, the request data associated with the second set of requests obtained from a log generated by the web service when processing the second set of requests, where the request data is based at least in part on data obtained from a set of trusted entities;

identify a first subset of the first set of requests and a second subset of the second set of requests from the request data that are generated at least in part by the set of trusted entities based at least in part on a cryptographic value generated using a key provided to a trusted entity of the set of trusted entities;

remove the first subset of the first set of requests and the second subset of the second set of requests from the request data as a result of identifying that the first subset and the second subset are generated at least in part by the set of trusted entities;

determine, based at least in part on the request data, a value corresponding to the first set of requests received by the service and relative to the second set of requests received by the web service;

determine that the value satisfies a set of conditions indicating a baseline ratio of a third set of requests received by the service relative to a fourth set of requests received by the web service, where the baseline ratio is determined such that the data generated in response to the set of trusted entities does not affect the value of the baseline ratio by at least determining the baseline ratio based at least in part on second request data is based at least in part on a subset of requests of the third set of requests and the fourth set of requests obtained from the set of trusted entities over a second interval of time distinct from the first interval of time;

identify an internet protocol address corresponding to an entity that causes the value to be indicative of an attack; and perform an operation to cause a change in future requests processed by the service by at least blocking network traffic associated with the entity.

6. The system of claim 5, wherein the one or more services further:

identify at least one request generated by the set of trusted entities by at least:

determining an internet protocol address corresponding to a trusted entity of the set of trusted entities; and identifying, from the request data, entries in the log having the internet protocol address corresponding to the trusted entity.

7. The system of claim 6, wherein identifying the at least one request generated by the set of trusted entities includes:

identifying, from the request data, entries in the log specifying a hash value generated by the trusted entity; and verifying the hash value using the cryptographic key.

8. The system of claim 5, wherein the operation includes transmitting a request to the service to associate an identifier of the resource with an internet protocol address of a content delivery network service that is usable to mitigate a denial of service attack to cause the future requests to be redirected to the content delivery network service.

9. The system of claim 5, wherein the operation includes transmitting, to a proxy server of the web service, internet protocol addresses of a set of entities identified as being responsible for submitting requests resulting in the value satisfying the set of conditions to cause the proxy server to block network traffic originating from the internet protocol addresses of the set of entities.

10. The system of claim 5, wherein the operation includes transmitting a notification specifying that a denial of service attack has been detected.

11. The system of claim 5, wherein the value is a ratio calculated by dividing a first number of requests processed by the web service specified in the request data over the first interval of time by a second number of requests processed by the service over the first interval of time.

12. A non-transitory computer-readable storage medium storing thereon executable instructions that, as a result of being executed by one or more processors of a computer system, cause the computer system to:

obtain request data comprising a set of log entries specifying a first set of requests received over an interval of time by a service that resolves an identifier to a set of network addresses for a resource and a second set of requests received over the interval of time by a web service for providing the resource, where the set of log entries includes entries generated in response to requests obtained from a set of trusted entities;

identify, from the set of log entries, entries specifying a first cryptographic hash generated using a cryptographic key and a shared secret provided to a trusted entity of the set of trusted entities;

generate a second cryptographic hash based at least in part on the cryptographic key and the shared secret;

determine that the shared secret is valid as a result of the first cryptographic hash matching the second cryptographic hash;

remove a subset of requests generated by the trusted entity of the set of trusted entities from the set of log entries by at least identifying, based at least in part on the set of log entries, the subset of requests of the first set of requests or the second set of requests generated by the trusted entity;

determine a request frequency ratio based at least in part on the first set of requests and the second set of requests;

compare the request frequency ratio to baseline request data to generate a determination that a set of conditions has been satisfied, where the determination is made without using the subset of requests generated by the trusted entity and the baseline request data is based at least in part on request data generated by the set of trusted entities;

identify an internet protocol address corresponding to an entity that caused the request frequency ratio to be indicative of an attack; and perform an operation to modify processing of future requests by the service in response to the determination.

13. The non-transitory computer-readable storage medium of claim 12, wherein the operation includes transmitting a request to the service that resolves the identifier to redirect network traffic directed at the resource to another service that can promulgate the operation.

14. The non-transitory computer-readable storage medium of claim 12, wherein the instructions that cause the computer system to identify the subset of requests generated by the trusted entity further cause the computer system to:
identify an internet protocol address corresponding to the trusted entity; and
identify entries in the set of log entries that specify the internet protocol address corresponding to the trusted entity.

15. The non-transitory computer-readable storage medium of claim 12, wherein the operation includes transmitting a notification to the web service to indicate that the set of conditions has been satisfied.

16. The non-transitory computer-readable storage medium of claim 12, wherein the operation includes:
identifying internet protocol addresses of a set of entities that caused the set of conditions to be satisfied; and
blocking network traffic from the internet protocol addresses of the set of entities that caused the set of conditions to be satisfied.

17. The non-transitory computer-readable storage medium of claim 16, wherein the instructions that cause the system to block network traffic from the internet protocol addresses of the set of entities that caused the set of conditions to be satisfied further include instructions that, as a result of being executed by the one or more processors, cause the computer system to redirect the network traffic to a proxy server responsible for blocking the network traffic.

18. The non-transitory computer-readable storage medium of claim 12, wherein the set of conditions indicates a threshold value relative to the request frequency ratio compared to a baseline ratio indicated by the baseline request data, where if a value of a comparison of the request frequency ratio compared to the baseline ratio is above the threshold value, the set of conditions is satisfied.

19. The non-transitory computer-readable storage medium of claim 12, wherein the trusted entity further comprises an administrator of the web service.

20. The non-transitory computer-readable storage medium of claim 12, wherein the instructions that cause the system to remove a subset of requests generated by a trusted entity from the set of log entries by at least identifying, based at least in part on the set of log entries, the subset of requests of the first set of requests or the second set of requests generated by the trusted entity further cause the computer system to identify a network address associated with the trusted entity included in the set of log entries.

* * * * *